Oct. 13, 1953
O. MORFIT
2,655,462
RECOVERY OF PHENOL FROM EXTRACTS
Filed Sept. 30, 1949
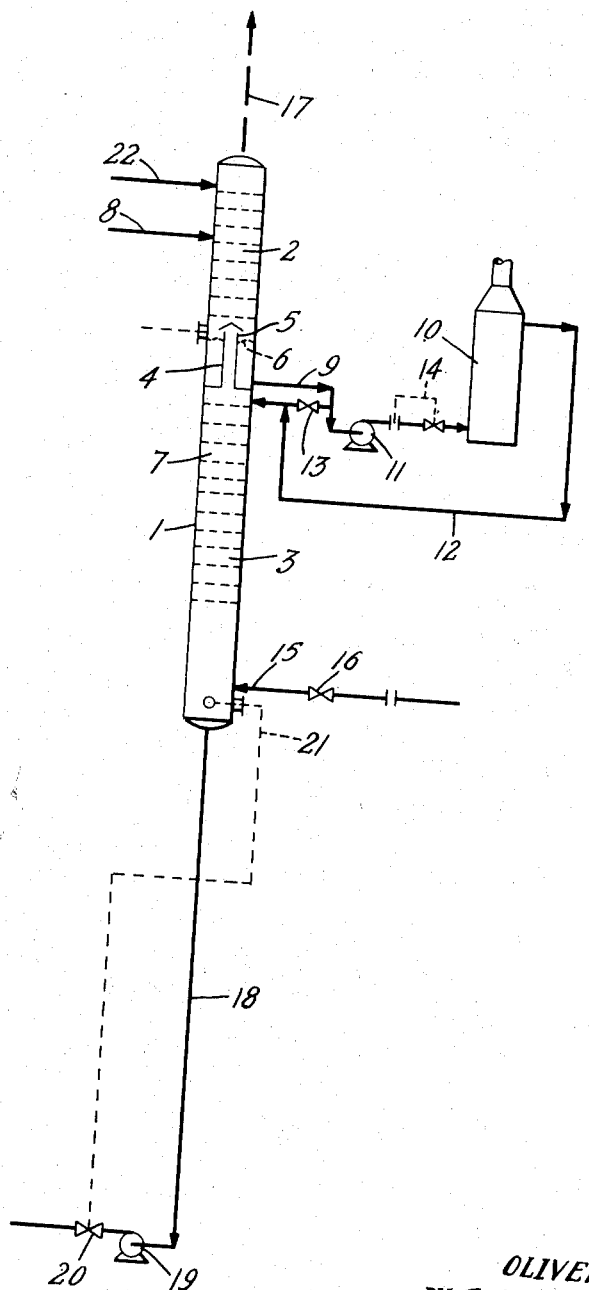
INVENTOR.
OLIVER MORFIT
BY E. F. Liebrecht
Edmond F. Shanahan
ATTORNEYS Patented Oct. 13, 1953

2,655,462

UNITED STATES PATENT OFFICE 2,655,462

RECOVERY OF PHENOL FROM EXTRACTS

Oliver Morfit, Hartsdale, N. Y., assignor to The M. W. Kellogg Company, Jersey City, N. J., a corporation of Delaware Application September 30, 1949, Serial No. 118,757

2 Claims. (Cl. 196—14.42)

This invention relates in general to the phenol treatment of lubricating oils to improve their quality by separating a raffinate of improved (i. e. higher) viscosity index. More particularly, this invention deals with the problem of recovering phenol from the extract phase obtained in the treatment of certain petroleum crudes having a peculiar tendency to form complexes or addition compounds with the phenol. The invention provides a method and apparatus for first eliminating from the extract phase the uncombined phenol, and then breaking the phenol-oil complex by heating to a temperature between 550° F. and 650° F.

In the case of most crude oils which are treated with phenol, the phenol can be recovered from the extract phase without difficulty by stripping the extract phase in the conventional manner at temperatures which do not exceed 450° F. to 500° F. However, certain crudes, for example, the Van Zandt crude obtained from various Texas oil fields, exhibit a tendency to form a complex between the phenol and some component of the oil so that the usual steam stripping fails to separate all of the phenol from the extract oil. It has not been determined exactly what the compounds are which cause the oil to absorb phenol in this manner, but the fact that such absorption occurs with consequent costly loss of phenol has been experienced, and the loss seems to be attributable to the formation of some type of complex or additional compound. For example, it is ordinarily the practice in treating such crudes with phenol to obtain an extract phase containing about 40 per cent of the reduced crude and comprised of about 11 per cent oil, 4 per cent water and 85 per cent phenol. After stripping, the extract oil should contain not more than .005 weight per cent phenol. However, a residual of 0.5 per cent phenol has been lost in extracts of Van Zandt reduced crudes. In a plant having the capacity of 3,000 barrels of reduced crude per day, this loss can represent approximately 2,500 pounds of phenol per day, having a value of about $250.00 per day, a loss too large to be tolerated.

In the method of the present invention the major portion of the phenol in the extract phase is removed by conventional processing, usually by heating to form a constant boiling mixture and phenol vapor at temperatures of about 250° to 440° F. to separate most of the phenol and produce a partially stripped extract phase comprised of about 95 per cent oil and 5 per cent phenol. The remaining material will be referred to in this specification and claims as an extract since substantially all of the phenol has been separated and the remaining material is usually about 95 per cent oil. The residual phenol cannot all be separated by conventional steam stripping. The method of the present invention involves heating the aforementioned extract to a temperature between 550° F. and 650° F. and then countercurrently contacting this heated extract with stripping steam. The steam and phenol vapors from this countercurrent contacting are employed as stripping gas for stripping extract charge prior to its heating. The method is conveniently practiced by means of a stripping tower separated into an upper stripping zone and a lower stripping zone by means of a draw-off pan adapted to accumulate liquid in the bottom of the upper stripping zone while permitting the passage of the vapors from the lower stripping zone into said upper stripping zone. A partially stripped extract phase (at a temperature of about 550° F.) is charged to the upper stripping zone and loses some of its phenol as a result of stripping action of vapors from the lower stripping zone and also as a result of lowered pressure (25″ vac.). The downwardly flowing liquid accumulates in the aforementioned draw-off pan, from which it is continuously withdrawn, heated in a furnace, and introduced into the upper end of the lower stripping zone. Because the heating temperature in the lower stripping zone is substantially higher than that in the upper stripping zone, the phenol-oil complexes are broken down by the heating, and steam introduced into the lower end of the stripping zone removes the vaporized phenol; the mixture of phenol vapors and steam passes upwardly to the chimney in the draw-off pan, accumulates additional phenol in the upper stripping zone, and is withdrawn from the upper end of the upper stripping zone to be diverted to phenol recovery.

This invention is illustrated in the accompanying drawing, which shows a novel type of stripping tower and auxiliary apparatus.

In the drawing, a stripping tower 1 is separated into an upper stripping zone 2 and a lower stripping zone 3 by means of a draw-off pan and chimney 4. Draw-off pan 4 permits the upward passage of vapors from lower stripping zone 3 to upper stripping zone 2 through chimney passage 5, and it accumulates liquid as indicated by liquid level 6, in stripping tower 1, which is provided with bubble trays 7 in both the upper and lower stripping zones.

Partially stripped extract phase is charged to an intermediate region of upper stripping zone 2 through an inlet 8 and flows downwardly over the various bubble trays 7, encountering vapors as it descends, and being accumulated at level 6 when it reaches the lower end of upper stripping zone 2. A conduit 9 is provided for continuously withdrawing oil and phenol solution from draw-off pan 4 so that all or a portion of said oil may be passed through a furnace 10, preferably with the aid of a pump 11. Heated oil from furnace 10 is introduced into the upper end of lower stripping zone 3 by means of conduit 12. A portion of the oil may by-pass furnace 10 and enter lower stripping zone 3 unheated except by its mixture with hot material from conduit 12, by opening valve 13. A flow controlled valve 14 is provided between pump 11 and furnace 10 to maintain a constant liquid flow to the furnace. As a result of the heating, phenol-oil complexes present in the extract accumulated in the draw-off pan 4 are dissociated.

Steam at a temperature of 300° F. to 500° F. is charged to the lower end of lower stripping zone 3 through steam inlet 15 at a rate determined by steam control valve 16. As the steam passes upwardly through lower stripping zone 3 and encounters the down flowing liquid therein, residual phenol resulting from the breaking up of the phenol-oil complexes is stripped away from the liquid. The steam is super heated and a vapor mixture of steam and phenol having a temperature of about 500° F. passes upwardly through lower tray passage 5 into the lower end of upper stripping zone 2 wherein it serves as stripping vapor. The phenol vapor and steam mixture is withdrawn through line 17 at the upper end of tower 1.

Extract oil, substantially free of phenol accumulates in the lower end of lower stripping zone 3 and is withdrawn through line 18 by means of pump 19 at a rate controlled by valve 20 operated by means of liquid level controller 21.

Preferably, phenol is returned to the upper end of upper stripping zone 2 through a reflux line 22.

Within lower stripping zone 3, temperatures of the liquid range from about 550° F. at the lower end to about 650° F. at the upper end, while vapor temperature ranges at about 600° F. at the upper end. In upper stripping zone 2 temperatures of both liquid and vapor are about 500° F. throughout except above the inlet where the reflux lowers the vapor temperature to 300° to 400° F.

I claim:

1. In the solvent treatment of lubricating oils to increase their viscosity index, which involves contacting oil with phenol to obtain a raffinate phase of improved viscosity index, and an extract phase comprised exclusively of extract oil, phenol, and water, and wherein substantially all of the phenol and water are separated from said extract phase by heating to produce an extract oil containing only a minor percentage of phenol, an improved method for recovering residual phenol, which method includes: countercurrently contacting said extract oil with a hot stripping gas in a first stripping zone to vaporize residual phenol; withdrawing extract oil containing phenol-oil complex not separated from said extract oil by gas stripping, and heating said extract oil to a temperature between 550° F. and 650° F.; countercurrently contacting said heated extract oil in a second stripping zone with a stripping gas introduced at a temperature between 300° F. and 500° F.; and recovering from said second stripping zone an extract oil substantially free of phenol.

2. In the solvent treatment of lubricating oils to increase their viscosity index, which involves contacting oil with phenol to obtain a raffinate phase of improved viscosity index, and an extract phase comprised exclusively of extract oil, phenol, and water, and wherein substantially all of the phenol and water are separated from said extract phase by heating to produce an extract oil containing only a minor percentage of phenol, an improved method for recovering residual phenol, which method includes: countercurrently contacting said extract oil with a hot stripping gas in a first stripping zone to vaporize residual phenol; withdrawing extract oil containing phenol-oil complex not separated from said extract oil by gas stripping, and heating said extract oil to a temperature between 550° F. and 650° F.; countercurrently contacting said heated extract oil in a second stripping zone with a stripping gas introduced at a temperature between 300° F. and 500° F.; passing said stripping gas, heated in said second stripping zone by said countercurrent contact upwardly through said first stripping zone; withdrawing vaporized residual phenol and stripping gases from the upper end of said second stripping zone and recovering said phenol; and recovering from said second stripping zone an extract oil substantially free of phenol.

OLIVER MORFIT.

References Cited in the file of this patent

UNITED STATES PATENTS

| Number | Name | Date |
|---|---|---|
| 2,052,196 | Stratford | Aug. 25, 1936 |
| 2,084,471 | Whiteley | June 22, 1937 |
| 2,120,810 | Parkhurst | June 14, 1938 |
| 2,216,933 | Atkins | Oct. 8, 1940 |
| 2,357,710 | Ullrich | Sept. 5, 1944 |
| 2,411,809 | Rupp et al. | Nov. 26, 1946 |